(12) United States Patent
Tsukada et al.

(10) Patent No.: US 11,008,467 B2
(45) Date of Patent: May 18, 2021

(54) METHOD FOR PRODUCING ANTI-FOULING COATING FILM, AND ANTI-FOULING COATING FILM

(71) Applicant: NISSAN MOTOR CO., LTD., Yokohama (JP)

(72) Inventors: Yoshiko Tsukada, Kanagawa (JP); Masanobu Sugimoto, Kanagawa (JP); Shinnichi Akaishi, Kanagawa (JP); Daijirou Sakurai, Kanagawa (JP); Yuji Noguchi, Kanagawa (JP); Masakazu Nishino, Shizuoka (JP); Tadashi Suzuki, Shizuoka (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/477,309

(22) PCT Filed: Jan. 10, 2018

(86) PCT No.: PCT/JP2018/000258
§ 371 (c)(1),
(2) Date: Jul. 11, 2019

(87) PCT Pub. No.: WO2018/131587
PCT Pub. Date: Jul. 19, 2018

(65) Prior Publication Data
US 2020/0032075 A1 Jan. 30, 2020

(30) Foreign Application Priority Data
Jan. 12, 2017 (JP) .............................. JP2017-003383

(51) Int. Cl.
*C09D 5/00* (2006.01)
*G02B 1/18* (2015.01)
(Continued)

(52) U.S. Cl.
CPC ............. *C09D 5/002* (2013.01); *B05D 5/083* (2013.01); *B05D 7/26* (2013.01); *B05D 7/51* (2013.01);
(Continued)

(58) Field of Classification Search
CPC .... C09D 5/1693; C09D 5/1681; C09D 5/002; B32B 3/30; B05D 7/26; B05D 7/51; B05D 7/5883; B05D 5/083
See application file for complete search history.

(56) References Cited

U.S. PATENT DOCUMENTS

2006/0246221 A1* 11/2006 Falk .................... C09D 183/16
427/331
2008/0138611 A1* 6/2008 Yasuzawa ................ B05D 7/51
428/336
(Continued)

FOREIGN PATENT DOCUMENTS

EP 3 485 985 A1 5/2019
JP 2015-024637 A 2/2015
(Continued)

*Primary Examiner* — Jasper Saberi
(74) *Attorney, Agent, or Firm* — Foley & Lardner LLP

(57) ABSTRACT

A method for producing an anti-fouling coating film includes: a step (1) of applying a fine uneven layer forming agent containing at least one type of polysilazane as at least one type of silica raw material on at least one surface of a base substrate, the aforementioned at least one surface comprising at least one type of resin, to form a fine uneven layer containing silica and polysilazane; a step (2) of applying a modification layer forming agent containing a reactive organic compound and polysiloxane or perfluoropolyether on a surface of the fine uneven layer obtained in the step (1), to form a modification layer containing polysiloxane or perfluoropolyether, and a step (3) of applying lubricating oil
(Continued)

containing silicone oil or fluorinated oil on a surface of the modification layer obtained in the step (2), to form a lubricating oil layer.

8 Claims, 6 Drawing Sheets

(51) Int. Cl.

| | | |
|---|---|---|
| B05D 7/26 | (2006.01) | |
| B05D 7/00 | (2006.01) | |
| C09D 171/02 | (2006.01) | |
| C09D 183/16 | (2006.01) | |
| C09D 191/00 | (2006.01) | |
| B32B 3/30 | (2006.01) | |
| C09D 5/16 | (2006.01) | |
| B05D 5/08 | (2006.01) | |
| B32B 27/28 | (2006.01) | |

(52) U.S. Cl.
CPC .............. *B05D 7/5883* (2013.01); *B32B 3/30* (2013.01); *C09D 5/16* (2013.01); *C09D 5/1637* (2013.01); *C09D 5/1681* (2013.01); *C09D 5/1693* (2013.01); *C09D 171/02* (2013.01); *C09D 183/16* (2013.01); *C09D 191/00* (2013.01); *G02B 1/18* (2015.01); *B32B 27/283* (2013.01); *B32B 27/285* (2013.01); *B32B 2307/7145* (2013.01); *B32B 2307/73* (2013.01); *C09D 5/1675* (2013.01)

(56) References Cited

U.S. PATENT DOCUMENTS

| | | | |
|---|---|---|---|
| 2014/0154504 A1* | 6/2014 | Adachi | C08J 7/0423 |
| | | | 428/339 |
| 2015/0152270 A1* | 6/2015 | Aizenberg | A61L 29/085 |
| | | | 210/500.27 |
| 2016/0032074 A1* | 2/2016 | Aizenberg | C08J 9/365 |
| | | | 514/772.4 |
| 2017/0101543 A1* | 4/2017 | Hironaga | B05D 3/108 |
| 2017/0283316 A1* | 10/2017 | Meuler | B05D 5/08 |
| 2018/0118957 A1* | 5/2018 | Brown | C09D 5/1693 |

FOREIGN PATENT DOCUMENTS

| | | |
|---|---|---|
| JP | 2015-066849 A | 4/2015 |
| JP | 2015-066850 A | 4/2015 |
| JP | 2017-001363 A | 1/2017 |
| WO | WO-2004/094531 A1 | 11/2004 |
| WO | WO-2008/120505 A1 | 10/2008 |
| WO | WO-2010/038648 A1 | 4/2010 |
| WO | WO-2012/149085 A1 | 11/2012 |
| WO | WO-2015/155830 A1 | 10/2015 |
| WO | WO-2016/069239 A2 | 5/2016 |
| WO | WO-2018/012093 A1 | 1/2018 |

* cited by examiner

METHOD FOR PRODUCING ANTI-FOULING COATING FILM, AND ANTI-FOULING COATING FILM

TECHNICAL FIELD

The present invention relates to a method for producing an anti-fouling coating film, and an anti-fouling coating film. More specifically, the present invention relates to a method for producing an anti-fouling coating film disposed on a base substrate having at least one surface comprising at least one type of resin, and an anti-fouling coating film.

BACKGROUND ART

High-durability water-repellent articles having excellent water-repellent properties and hydroplaning properties (water droplet slidability), and window glasses for architecture and window glasses for vehicles applying these have been proposed. This water-repellent article is an article obtained by forming a void layer which is substantially composed of an inorganic material and which has a void structure on a base substrate, and thereafter impregnating voids of the void layer with water-repellent material. Furthermore, a foundation layer is provided between the base substrate and the void layer having the void structure. Moreover, the foundation layer is preferably composed of an inorganic material similar to the component material of the void layer, for example a ceramic material such as silicon dioxide ($SiO_2$), alumina ($Al_2O_3$), titanium oxide ($TiO_2$), indium oxide ($InO_3$), tin oxide ($SnO_2$), tantalum oxide ($Ta_2O_5$), or zirconia ($ZrO_2$), in terms of obtaining high permeability (see Patent Literature 1.).

CITATION LIST

Patent Literature

Patent Literature 1: WO 2008/120505A

SUMMARY OF INVENTION

Technical Problem

However, the method for producing the water-repellent article disclosed in Patent Literature 1 had the problem that it cannot be applied for cases attempting to form an anti-fouling coating film having excellent anti-fouling property and durability by using a base substrate having a surface comprising resin, in a relatively short period of time.

The present invention has been made in view of the aforementioned problem in the prior art, and an object of the present invention is to provide a method for producing an anti-fouling coating film as well as an anti-fouling coating film which has excellent anti-fouling property and durability and which can be formed in a relatively short period of time, in a case of using a base substrate having at least one surface comprising at least one type of resin as well as.

Solution to Problem

The present inventors have conducted an intensive study to achieve the aforementioned object. As a result, the present inventors have found out that the above object can be achieved by applying a fine uneven layer forming agent containing at least one type of polysilazane as at least one type of silica raw material on at least one surface of a base substrate, the aforementioned at least one surface comprising at least one type of resin, to form a fine uneven layer containing silica and polysilazane, followed by applying a predetermined modification layer forming agent, and thereafter, applying a predetermined lubricating oil, and accomplished the present invention.

Advantageous Effect of Invention

According to the present invention, it is possible to provide a method for producing an anti-fouling coating film as well as an anti-fouling coating film which has excellent anti-fouling property and durability and which can be formed in a relatively short period of time, in a case of using a base substrate having at least one surface comprising at least one type of resin.

DESCRIPTION OF EMBODIMENTS

The following describes in details of a method for producing an anti-fouling coating film, and an anti-fouling coating film, according to one embodiment of the present invention, with reference to the drawings. The dimensions of the drawings referred to in the following embodiments are exaggerated for descriptive reasons and may be different from the actual dimensions.

First Embodiment

Figure 1:
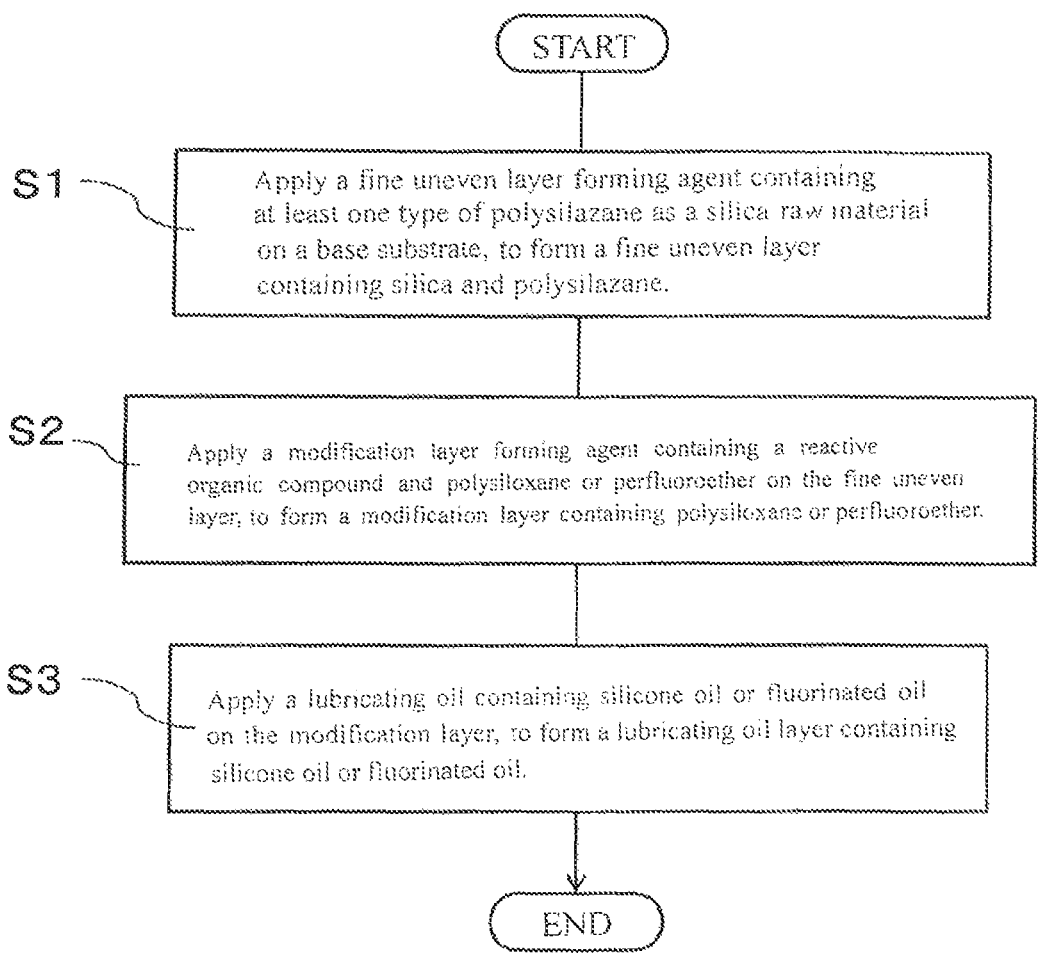
FIG. 1 is a flow diagram of a method for producing an anti-fouling coating film according to a first embodiment of the present invention.

First described in detail is a method for producing an anti-fouling coating film according to a first embodiment of the present invention. FIG. 1 is a flow diagram of a method for producing an anti-fouling coating film according to the first embodiment of the present invention. As shown in FIG. 1, the method for producing an anti-fouling coating film of the present embodiment includes the following steps (1) to (3). In FIG. 1, "step (1)" will be abbreviated as "S1", for example (The same hereinafter.).

Step (1) is a step of forming a fine uneven layer containing silica and polysilazane by applying a fine uneven layer forming agent containing at least one type of polysilazane as at least one type of silica raw material on at least one surface of a base substrate, the aforementioned at least one surface comprising at least one type of resin. It is possible to form a desired fine uneven layer that allows immersion of lubricating oil (contained in a lubricating oil layer later described) and retaining of the lubricating oil to a certain degree, just by applying polysilazane on the aforementioned at least one surface of the base substrate.

The containment of silica in the fine uneven layer may be confirmed by a peak of Si—O at 1100 cm$^{-1}$ observed with Fourier transform infrared spectroscopy (FT-IR).

Moreover, the containment of polysilazane, in particular perhydropolysilazane in the fine uneven layer may be confirmed by a peak of Si—N and a peak of Si—H at 2200 cm$^{-1}$ observed with Fourier transform infrared spectroscopy (FT-IR).

Step (2) is a step of forming a modification layer containing polysiloxane or perfluoropolyether by applying a modification layer forming agent containing a reactive organic compound and polysiloxane or perfluoropolyether on a surface of the fine uneven layer obtained in step (1).

The polysiloxane or perfluoropolyether contained in the modification layer is preferably in a form in which a polysiloxane or perfluoropolyether chain is added onto the fine uneven layer by the reaction of the reactive organic compound and the polysiloxane or perfluoropolyether with the surface of the fine uneven layer.

Step (3) is a step of applying lubricating oil containing silicone oil or fluorinated oil on a surface of the modification layer obtained in step (2), to form a lubricating oil layer containing silicone oil or fluorinated oil.

By undergoing the aforementioned steps (1) to (3), it is possible to provide a method for producing an anti-fouling coating film which has excellent anti-fouling property and durability and which can be formed in a relatively short period of time, in a case of using a base substrate having at least one surface comprising at least one type of resin. Moreover, there is a secondary advantage that the anti-fouling coating film can be formed without heat treatment.

Hereinafter, each step will be individually described in more detail.

<Step (1)>

Figure 2:
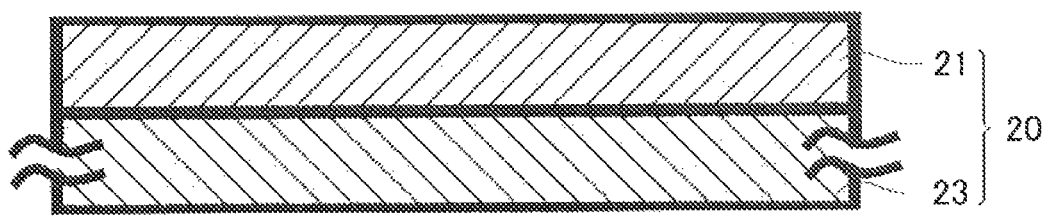
FIG. 2 is a cross-sectional view schematically showing one example of a base substrate having at least one surface comprising at least one type of resin used in step (1).
Figure 3:
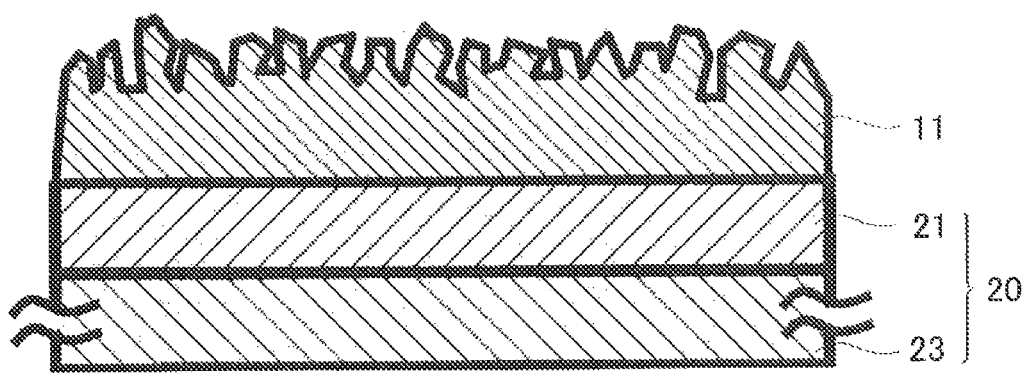
FIG. 3 is a cross-sectional view schematically showing the base substrate having a fine uneven layer in step (1).

FIG. 2 is a cross-sectional view schematically showing one example of the base substrate having at least one surface comprising at least one type of resin used in step (1). A base substrate 20 shown in FIG. 2 has a coating film 21 formed by using at least one type of coating containing at least one type of resin component on a steel plate 23. FIG. 3 is a cross-sectional view schematically showing the base substrate having the fine uneven layer in step (1). Components identical to those described above are assigned with the same reference signs, and descriptions thereof will be omitted. As shown in FIG. 3, a line uneven layer 11 is formed on the surface of the base substrate 20. Although not illustrated, the fine uneven layer contains silica and polysilazane as described above.

The base substrate having at least one surface comprising at least one type of resin used in step (1) is not limited to, for example, a base substrate composed of at least one type of resin itself, or one having at least one coating film formed by using at least one type of coating containing at least one type of resin component on a resin body. Namely, as described above, it is possible to employ, as the base substrate, one having at least one coating film formed by using at least one type of coating containing at least one type of resin component on a metal body or a ceramics body.

The fine uneven layer forming agent containing at least one type of polysilazane being at least one type of silica raw material used in step (1) is not particularly limited as long as it contains polysilazane being at least one type of silica raw material.

Polysilazanes are inorganic polymers having the structure represented by the following chemical formula (1) serve as their basic unit. Generally, the polysilazanes include those called organopolysilazane having at least one organic functional group and those called perhydropolysilazane (PHPS) having only hydrogen. Just one type of these may be used alone, or a plurality of these types may be used in a mixed manner. Among these, it is preferable to use perhydropolysilazane (PHPS) as the polysilazane being at least one type of silica raw material.

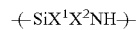

[Chem. 1]

where $X^1$, $X^2$ may be identical or different, and represent at least one type selected from a group consisting of hydrogen (H) and at least one organic functional group (R).

The aforementioned at least one type of organic functional group (R) includes, for example, an alkyl group such as a methyl group.

The fine uneven layer forming agent may contain a solvent that disperses the polysilazane or a catalyst that promotes the reaction. Examples of such solvent include xylene, mineral spirits and so on.

Furthermore, as an application method for forming the fine uneven layer containing silica and polysilazane by applying a fine uneven layer forming agent containing at least one type of polysilazane as at least one type of silica raw material on at least one surface of the base substrate, the aforementioned at least one surface comprising at least one type of resin, conventionally known methods can be employed, for example, such as brush coating, roller coating, spin coating, spray application, roll coating, flow coating, and dip coating. Of course, hand-painting by using cotton or the like may also be employed.

Moreover, although not particularly limited, it is preferable in the method for producing an anti-fouling coating film of the present embodiment, in step (1), to perform a silica conversion promoting treatment after applying the fine uneven layer forming agent, to form the fine uneven layer.

The silica conversion promoting treatment is not particularly limited as long as it is a treatment that can promote the conversion of polysilazane to silica. By promoting the silica conversion, it is possible to form a surface state in which a reaction with the modification layer forming agent in step (2) later described readily proceeds. This allows for forming an anti-fouling coating film having more excellent anti-fouling property and durability in a shorter period of time in the case of using a base substrate having at least one surface comprising at least one type of resin.

Moreover, it is also possible to mention, as a suitable example of the silica conversion promoting treatment, retaining a fine uneven layer forming agent applied under an environment in which at least one of humidification and warming is performed.

Usually, in the silica conversion promoting treatment, a fine uneven layer forming agent applied is retained under the environment of a relative humidity of about 40% RH, a temperature of 15 to 35° C. (normal temperature), preferably about 20 to 30° C. Moreover, it is needless to say that the method for producing an anti-fouling coating film of the present invention includes a case of not performing the aforementioned silica conversion promoting treatment.

Furthermore, for the humidification, although not particularly limited, in terms of being able, in the case of using the base substrate having at least one surface comprising at least one type of resin, to accomplish an excellent anti-fouling property and durability and to confirm the reducing effect of a duration of time required for the step, it is preferable for the relative humidity to be 50% RH or more, more preferable for the relative humidity to be 60% RH or more, and further preferable for the relative humidity to be 70% RH or more. The relative humidity may be 100% RH, however in terms of avoiding ununiform silica conversion in a plane direction of the fine uneven layer and to accomplish a uniform silica conversion in the plane direction of the fine uneven layer, it is preferable for the relative humidity to be 90% RH or less, and it is more preferable for the relative humidity to be 80% RH or less in the humidification.

Moreover, for the warming, the temperature is not particularly limited if it is a temperature lower than the softening point or melting point of the resin, however in terms of being able, in the case of using the base substrate having at least one surface comprising at least one type of resin, to accomplish an excellent anti-fouling property and durability and to confirm the reducing effect of a duration of time required for the step, it is preferable for the temperature to be 40° C. or more. Moreover, when the softening point or melting point of the resin is high, and it is possible to heat at 100° C. or more, heating at 100° C. or more for around 30 minutes will also be effective.

Furthermore, for humidification in the case of using the base substrate having at least one surface comprising at least one type of resin, it is possible to accomplish an excellent anti-fouling property and durability and confirm the reducing effect of a duration of time required for the step even at normal temperature. However, in the case of humidification at normal temperature, it is more preferable to retain for one hour or more. Moreover, humidification and warming promotes the reaction of the fine uneven layer forming agent, which can further promote the silica conversion.

As described above, by humidification and warming, the reaction of the fine uneven layer forming agent is promoted, and the silica conversion time after applying the fine uneven layer forming agent can be reduced. Moreover, the anti-fouling coating film formed as such can accomplish an excellent anti-fouling property and durability in the case of using a base substrate having at least one surface comprising at least one type of resin. Moreover, the anti-fouling coating film formed in this way also has a secondary advantage that cost reduction can be achieved due to the reduction of time required for the step.

<Step (2)>

Figure 4:
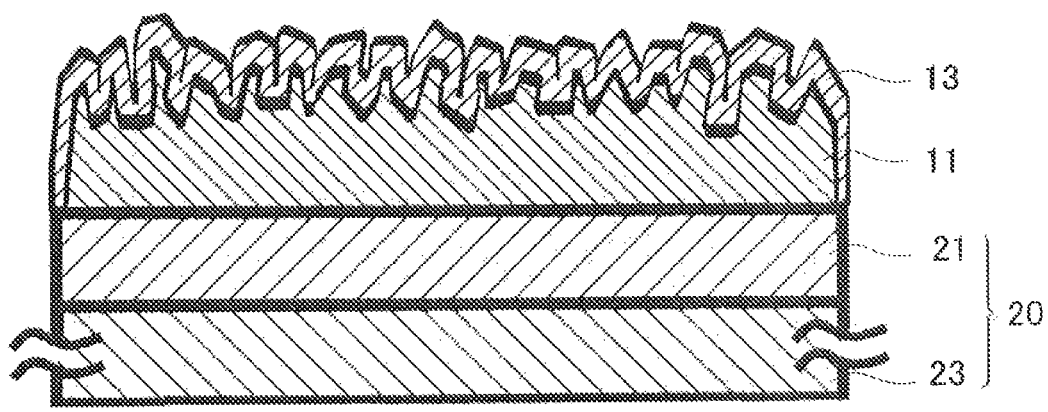
FIG. 4 is a cross-sectional view schematically showing the base substrate having the fine uneven layer and a modification layer in step (2).

FIG. 4 is a cross-sectional view schematically showing the base substrate having the fine uneven layer and the modification layer in step (2). Components identical to those described above are assigned with the same reference signs, and descriptions thereof will be omitted. As shown in FIG. 4, the fine uneven layer 11 and the modification layer 13 are formed on the surface of the base substrate 20. Although not illustrated, the fine uneven layer contains silica and polysilazane, as described above. Moreover, the modification layer contains polysiloxane or perfluoropolyether, as described above. It should be noted that the modification layer may contain both polysiloxane and perfluoropolyether.

The modification layer forming agent used in step (2) containing a reactive organic compound and polysiloxane or perfluoropolyether is not particularly limited as long as it contains the reactive organic compound and polysiloxane or perfluoropolyether. The reactive organic compound may include, for example, a reactive organic compound not containing a metal, or a reactive organometallic compound. The reactive organic compound not containing a metal may include, for example, a compound having a hydroxyl group, carbonyl group, or isocyanate group, and which directly reacts with an Si—OH group. Although not particularly limited, specific examples of the reactive organic compound not containing a metal includes alcohol, carboxylic acid, and isocyanate. The reaction proceeds with these compounds, even though a metal is not included in the structure of the compound. The reactive organometallic compound may include a compound having the aforementioned hydroxyl group, carbonyl group, isocyanate group and the like. Although not particularly limited, a more suitable reactive organometallic compound includes a hydrolyzable organometallic compound. Although not particularly limited, the hydrolyzable organometallic compound includes, for example, a hydrolyzable organometallic compound including titanium, aluminum, silicon, zirconium and the like. Although not particularly limited, the reactive group may include, for example, a substituent such as an alkoxy group, allyloxy group, halogen group, and halogenated alkyl group. Although not particularly limited, suitable examples of the reactive group include groups capable of bonding to oxides by hydrolysis, for example: alkoxy groups such as a methoxy group, ethoxy group, and propoxy group; halogenated alkoxy groups such as a trifluoromethoxy group, trifluoroethoxy group, and trichloroethoxy group; alkoxy-substituted alkoxy groups such as a methoxyethoxy group; acyloxy groups such as an acetoxy group, propionyloxy group, and benzoyloxy group; alkenyloxy groups such as an isopropenyloxy group and isobutenyloxy group; ketoxime groups such as a dimethyl ketoxime group, methylethyl ketoxime group, and diethyl ketoxime group: iminoxy groups such as a cyclohexanoxime group; substituted amino groups such as a methylamino group, ethylamino group, dimethylamino group, and diethylamino group; amide groups such as N-methylacetoamide group and N-ethylamido group; substituted aminooxy groups such as a dimethylaminooxy group and diethylaminooxy group; and halogen groups such as a chlorine atom, ester groups and the like. The modification layer forming agent may contain a solvent that disperses the reactive organic compound and polysiloxane or perfluoropolyether. The solvent in the modification layer forming agent containing the reactive organic compound and polysiloxane may include, for example, toluene, acetone, and methyl ethyl ketone. Moreover, the solvent in the modification layer forming agent containing the reactive organic compound and perfluoropolyether may include, for example, a fluorine-based solvent.

Moreover, as an application method in forming the modification layer containing polysiloxane or perfluoropolyether by applying the modification layer forming agent containing a reactive organic compound and polysiloxane or perfluoropolyether on the surface of the fine uneven layer, conventionally known methods can be employed, for example, brush coating, roller coating, spin coating, spray application, roll coating, flow coating, and dip coating. Of course, hand-painting by using cotton and the like may also be employed.

Furthermore, although not particularly limited, in the method for producing an anti-fouling coating film of the present embodiment, in step (2), it is preferable to perform a modification promoting treatment after applying the modification layer forming agent, to form the modification layer.

The modification promoting treatment is not particularly limited as long as it is, for example, a treatment that can promote the reaction between a reactive group in the modification layer forming agent containing the reactive organic compound and polysiloxane and/or perfluoropolyether and silica, namely modification. By promoting modification, it is possible to form a surface state that can readily retain the silicone oil and fluorinated oil in step (3) later described. This allows for forming the anti-fouling coating film having a further excellent anti-fouling property and durability in a short period of time in the case of using a base substrate having at least one surface comprising at least one type of resin.

Moreover, a suitable example of the modification promoting treatment includes retaining the modification layer forming agent applied under an environment, in which at least one of humidification and warming is performed.

Usually, in the modification promoting treatment, a modification layer forming agent applied is retained under an environment with a relative humidity of around 40% RH, and a temperature of 15 to 35° C. (normal temperature), preferably around 20 to 30° C. Moreover, it is needless to say that the method for producing the anti-fouling coating film of the present invention includes a case, in which the aforementioned modification promoting treatment is not performed.

Furthermore, for the humidification, although not particularly limited, in terms of being able, in the case of using the base substrate having at least one surface comprising at least one type of resin, to accomplish an excellent anti-fouling property and durability and to confirm the reducing effect of a duration of time required for the step, it is preferable for the relative humidity to be 50% RH or more, more preferable for the relative humidity to be 60% RH or more, and further preferable for the relative humidity to be 70% RH or more. The relative humidity may be 100% RH, however in terms of avoiding ununiform modification in a plane direction of the modification layer and to accomplish a uniform modification in the plane direction of the modification layer, it is preferable for the relative humidity to be 90% RH or less, and more preferable for the relative humidity to be 80% RH or less in the humidification.

Moreover, for the warming, the temperature is not particularly limited if it is a temperature lower than the softening point or melting point of the resin, however in terms of being able, in the case of using the base substrate having at least one surface comprising at least one type of resin, to accomplish an excellent anti-fouling property and durability and to confirm the reducing effect of a duration of time required for the step, it is preferable for the temperature to be 40° C. or more. Moreover, when the softening point or melting point of the resin is high, and it is possible to heat at 100° C. or more, heating at 100° C. or more for around 30 minutes will also be effective.

Furthermore, for humidification in the case of using the base substrate having at least one surface comprising at least one type of resin, it is possible to accomplish an excellent anti-fouling property and durability and confirm the reducing effect of a duration of time required for the step even at normal temperature. However, in the case of humidification at normal temperature, it is more preferable to retain for one hour or more. Moreover, humidification and warming promotes the reaction of the modification layer forming agent, which can further promote the modification.

As described above, by humidification and warming, the reaction of the modification layer forming agent is promoted, and the modification time after applying the modification layer forming agent can be reduced. Moreover, the anti-fouling coating film formed as such can accomplish an excellent anti-fouling property and durability in the case of using a base substrate having at least one surface comprising at least one type of resin. Moreover, the anti-fouling coating film formed in this way also has a secondary advantage that cost reduction can be achieved due to the reduction of time required for the step.

<Step (3)>

The lubricating oil containing silicone oil or fluorinated oil, used in the aforementioned step (3), is not particularly limited as long as it can form a lubricating oil layer containing silicone oil or fluorinated oil. The lubricating oil can be silicone oil itself or fluorinated oil itself. In terms of forming a lubricating oil layer by impregnation for example, the lubricating oil preferably has low surface energy and is non-volatile. Specifically, silicone oils such as dimethyl silicone oil and modified silicone oil, fluorinated oils such as fluoropolyether oil and perfluoropolyether oil can be mentioned as suitable examples. In case the modification layer contains polysiloxane, it is preferable to apply a silicone oil, and in case the modification layer contains perfluoropolyether, it is preferable to apply a fluorinated oil, however it is not limited thereto. Moreover, both the silicone oil and fluorinated oil can be used as appropriate.

Moreover, as the application method in forming the lubricating oil layer containing silicone oil or fluorinated oil by applying a lubricating oil containing silicone oil or fluorinated oil on the surface of the modification layer, a conventionally known method as described above can be applied, however it is preferable to, for example, drop the silicone oil or fluorinated oil onto the surface of the modification layer and impregnate it with the oil by hand-painting using cotton or the like.

Second Embodiment

Figure 5:
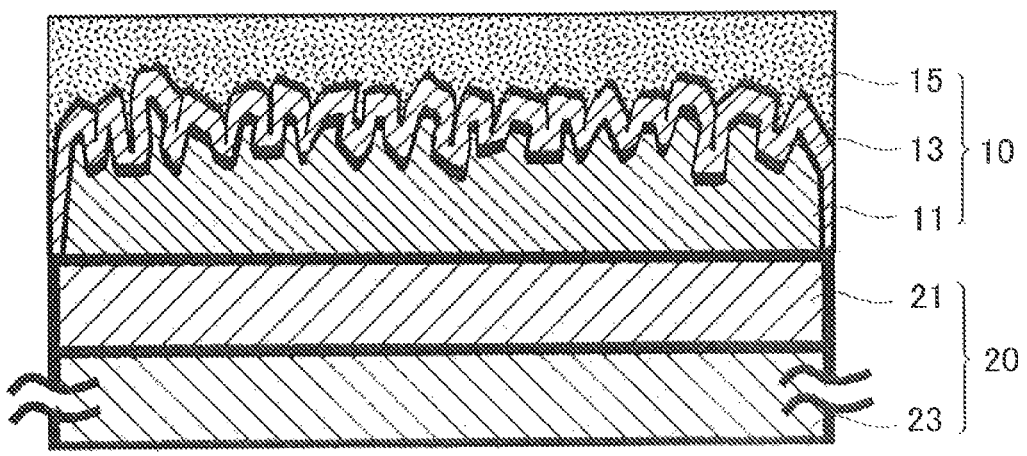
FIG. 5 is a cross-sectional view schematically showing a base substrate having an anti-fouling coating film according to a second embodiment of the present invention.

Next describes in detail of an anti-fouling coating film according to a second embodiment of the present invention. FIG. 5 is a cross-sectional view schematically showing a base substrate having an anti-fouling coating film according to the second embodiment of the present invention. Components identical to those described above are assigned with the same reference signs, and descriptions thereof will be omitted.

Moreover. FIG. 5 can also be said as a cross-sectional view schematically showing a base substrate having an anti-fouling coating film comprising the fine uneven layer; the modification layer and the lubricating oil layer in step (3). Namely, the method for producing an anti-fouling coating film of the present invention is a preferable embodiment of the method for producing the anti-fouling coating film of the present invention. However, the anti-fouling coating film of the present invention is not limited to one prepared by the method for producing an anti-fouling coating film of the present invention.

As shown in FIG. 5, an anti-fouling coating film 10 of the present embodiment is disposed on the base substrate 20 having a surface comprising resin. The anti-fouling coating film 10 comprises the fine uneven layer 11 disposed on the base substrate 20, the modification layer 13 disposed on a surface of the fine uneven layer 11, and the lubricating oil layer 15 disposed on a surface of the modification layer 13.

Although not illustrated, the fine uneven layer contains silica and polysilazane described above in detail. The containment of silica in the fine uneven layer may be confirmed by a peak of Si—O at 1100 $cm^{-1}$ observed with Fourier transform infrared spectroscopy (FT-IR). Moreover, the containment of polysilazane, in particular perhydropolysilazane in the fine uneven layer may be confirmed by a peak of Si—N and a peak of Si—H at 2200 $cm^{-1}$ observed with Fourier transform infrared spectroscopy (FT-IR).

Moreover, although not illustrated, the modification layer contains polysiloxane or perfluoropolyether described above in detail. Preferably, the polysiloxane or perfluoropolyether contained in the modification layer is contained in a form in which a polysiloxane or perfluoropolyether chain is added onto the fine uneven layer by the reaction of the reactive organic compound and the polysiloxane or perfluoropolyether with the surface of the fine uneven layer.

Furthermore, the lubricating oil layer contains silicone oil or fluorinated oil described above in detail.

This lubricating oil layer imparts excellent anti-fouling property and durability to an anti-fouling coating film. Moreover, such an anti-fouling coating film can be formed in a relatively short period of time.

Moreover, in the anti-fouling coating film of the present embodiment, although not particularly limited, the fine uneven layer differs in polysilazane content in a thickness direction of the fine uneven layer, and preferably, in the fine uneven layer, the polysilazane content on the side of the base substrate is higher than the polysilazane content on the side of the modification layer.

The content of the silica and polysilazane (Particularly, perhydropolysilazane.) in the fine uneven layer can be calculated from a ratio of a Si—O peak height at 1100 cm$^{-1}$ and a Si—H peak height at 2200 cm$^{-1}$ in Fourier transform infrared spectroscopy (FT-IR).

With this fine uneven layer, adhesion improves between the base substrate and the fine uneven layer by the polysilazane present on the surface side of the base substrate. As a result, the adhesion improves between the base substrate and the modification layer and/or lubricating oil layer. This imparts an excellent anti-fouling property and further excellent durability to an anti-fouling coating film. Moreover, such an anti-fouling coating film can also be formed in a relatively short period of time.

EXAMPLES

The following describes the present invention in further details with Examples. However, the present invention is not limited to these Examples.

Example 1

As a coated plate which is one example of the base substrate having at least one surface comprising at least one type of resin, a plate obtained by conducting electrodeposition of a zinc phosphate treated dull steel plate with a cation electrodeposition coating, followed by coating with a color base coating, and then coating with a clear coating (whose main component is urethane-based resin.) was used. Moreover, in order to prepare a sample for use in evaluation by Fourier transform infrared spectroscopy (FT-IR), an aluminum substrate was prepared.

First, a fine uneven layer forming agent (TRESMILE ANP140-1 (including a catalyst.) manufactured by Sanwa Kagaku Corp.) containing at least one type of polysilazane as at least one type of silica raw material was applied onto the coated plate and the aluminum substrate with a cloth impregnated with the agent, and dried, to form a fine uneven layer. The fine uneven layer formed on the aluminum substrate was subjected to evaluation by Fourier transform infrared spectroscopy (FT-IR).

Next, a modification layer forming agent containing a reactive organic compound and perfluoropolyether (NOVEC 7100 manufactured by 3M, 0.1% concentration, solvent: fluorine-based solvent) was applied onto the fine uneven layer formed on the coated plate by flow coating, and then it was retained for one hour under an environment of 45° C. and a relative humidity of 70% RH, to form a modification layer.

Thereafter, 0.25 mL of fluorinated oil (KRYTOX (registered trademark) 103, manufactured by Du Pont) was dripped onto the modification layer, the oil was made to fit on the surface with a cloth (BEMCOT), then the modification layer was allowed to be impregnated with the oil by leaving it for five minutes. And then, the oil was wiped off with the cloth to the degree that no iridescent unevenness remained, to obtain the anti-fouling coating film of the present Example. A part of the specification is shown in Table 1.

Examples 2 to 6 and Comparative Example 1

As shown in Table 1, the anti-fouling coating films for each Example were obtained by repeating the same operations as Example 1, except that the fine uneven layer forming agent was altered.

TABLE 1

|  | Fine uneven layer forming agent | Catalyst |
|---|---|---|
| Example 1 | TRESMILE ANP140-1 | Contained in fine uneven layer forming agent |
| Example 2 | TRESMILE ANP140-2 | Contained in fine uneven layer forming agent |
| Example 3 | TRESMILE ANAX121-1 | Contained in fine uneven layer forming agent |
| Example 4 | TRESMILE ANAX125L-1 | Contained in fine uneven layer forming agent |
| Example 5 | TRESMILE N144401 | Contained in fine uneven layer forming agent |
| Example 6 | TRESMILE C144401 | Contained in fine uneven layer forming agent |
| Comparative Example 1 | Tetraethoxysilane IPA solution (0.1 mass %) | Phosphoric acid/alkoxysilane solution |

| SiO/SiH Immediately after to three days later | Initial sliding angle (°) | Sliding angle after heat endurance (°) |
|---|---|---|
| 0.08 to 0.75 | 8.3 | 8.8 |
| 0.61 to 0.95 | 9.7 | 8.0 |
| 0.66 to 1.30 | 9.0 | 8.8 |
| 0.04 to 0.40 | 8.2 | 9.7 |
| 0.64 to 1.55 | 11.8 | 12.0 |
| 0.30 to 0.44 | 12.0 | 10.0 |
| • to 25.0 (No SiH peak immediately after) | 9.5 | 23.0 |

Performance Evaluation
Evaluation by Fourier Transform Infrared Spectroscopy (FT-IR)

Fourier transform infrared spectroscopy (FT-IR) evaluation was performed using the samples for Fourier transform infrared spectroscopy (FT-IR) (the fine uneven layer formed on the aluminum substrate) evaluation of each Example. Specifically, a Fourier transform infrared spectrometer (FT/IR-4200 type A, manufactured by JASCO Corporation) was used to determine a ratio of peak heights upon removal of a background, for SiO/SiH immediately after application of the fine uneven layer forming agent and three days after the application, with used peaks being SiH (2200 cm$^{-1}$), SiO (1100 cm$^{-1}$). The results obtained are shown together in Table 1.

Figure 6:
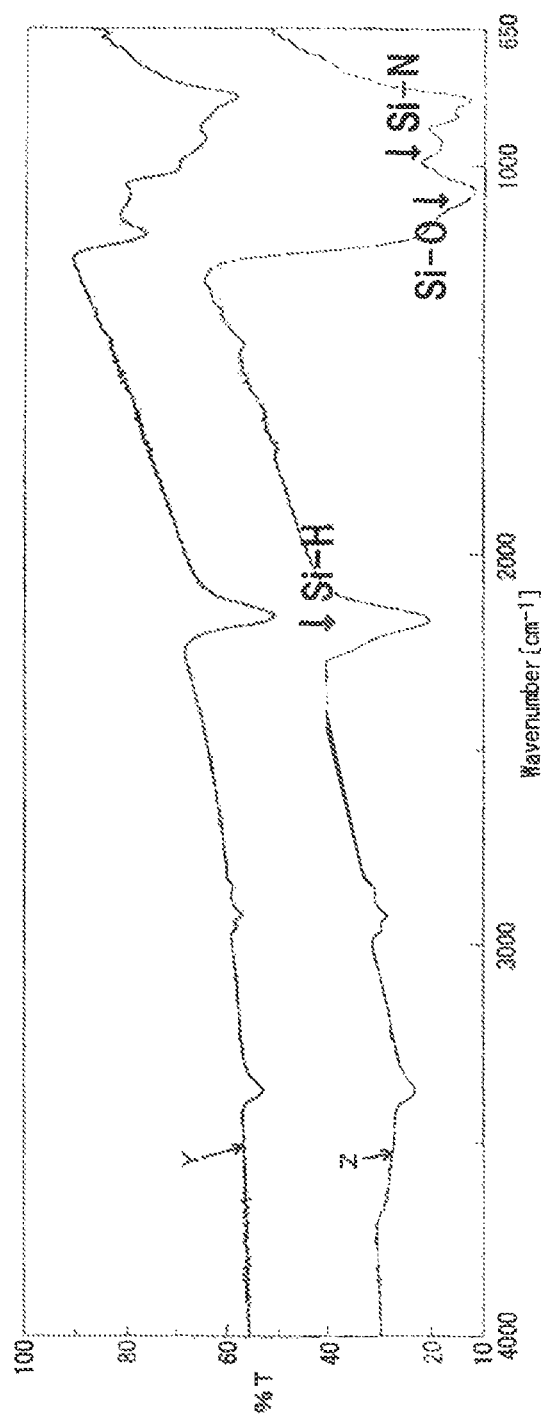
FIG. 6 is a spectrum of a Fourier transform infrared spectroscopy (FT-IR) in Example 2.

FIG. 6 is a spectrum of the Fourier transform infrared spectroscopy (FT-IR) for Example 2. Y in the drawing represents immediately after the application, and Z represents three days after the application.

Anti-Fouling Property/Durability Evaluation

Anti-fouling coating films of each Example were used to measure a sliding angle. Specifically, DSA 100 (manufactured by Kruss) was used to measure an initial sliding angle and a sliding angle after heat endurance. The results obtained are shown together in Table 1. The initial sliding angle is a sliding angle immediately after formation of the anti-fouling coating film. Moreover, the sliding angle after heat endurance is the sliding angle after endurance at 90° C. for four hours after formation of the anti-fouling coating film.

From the results in Table 1 of immediately after the application of SiO/SiH and three days thereafter, it can be seen that, in the formation of the fine uneven layer in Examples 1 to 6 included in the scope of the present invention using the line uneven layer forming agent containing polysilazane, the fine uneven layer containing silica and polysilazane can be formed in a relatively short period of time. Namely, it can be seen that the anti-fouling coating film of Examples 1 to 6 belonging to the scope of the present invention can be formed in a relatively short period of time.

Moreover, from the results of the initial sliding angles and the sliding angles after heat endurance in Table 1, it can be seen that the anti-fouling coating films of Examples 1 to 6 included in the scope of the present invention is small in the initial sliding angle to the same degree, and the sliding angle after heat endurance is significantly small, compared to the anti-fouling coating film of Comparative Example 1 which is outside of the present invention. Moreover, it can be seen that in the anti-fouling coating films of Examples 1 to 6 included in the scope of the present invention, the initial sliding angle and the sliding angle after heat endurance are of the same degree. From these results, it can be seen that the anti-fouling coating films of Examples 1 to 6 included in the scope of the present invention have excellent anti-fouling property and durability.

Moreover, it can also be considered that the excellent anti-fouling property and durability are obtained by the increase of the polysilazane content on the surface side of the base substrate due to the forming of the fine uneven layer by applying a fine uneven layer forming agent containing polysilazane as described above.

While the present invention is described with some embodiments and examples, the present invention is not limited thereto, and a variety of modifications can be made within the scope of the present invention.

REFERENCE SIGNS LIST

10 Anti-fouling coating film
11 Fine uneven layer
13 Modification layer
15 Lubricating oil layer
20 Base substrate
21 Coating film
23 Steel plate

The invention claimed is:

1. A method for producing an anti-fouling coating film, the anti-fouling coating film disposed on a base substrate having at least one surface comprising at least one type of resin, wherein the anti-fouling coating film comprises:
a fine uneven layer disposed on the base substrate having the aforementioned at least one surface, the fine uneven layer containing a silica and a polysilazane;
a modification layer disposed on a surface of the fine uneven layer, the modification layer containing a polysiloxane or a perfluoropolyether; and
a lubricating oil layer disposed on a surface of the modification layer, the lubricating oil layer containing a silicone oil or a fluorinated oil,
wherein the fine uneven layer differs in a polysilazane content in a thickness direction of the fine uneven layer, and the polysilazane content on a side of the base substrate is higher than the polysilazane content on a side of the modification layer,
the method comprising:
a step (1) of applying a fine uneven layer forming agent containing at least one type of a polysilazane as at least one type of a silica raw material on the at least one surface of the base substrate to form the fine uneven layer containing the silica and the polysilazane;
a step (2) of applying a modification layer forming agent containing a reactive organic compound and the polysiloxane or the perfluoropolyether on the surface of the fine uneven layer obtained in the step (1), to form the modification layer containing the polysiloxane or the perfluoropolyether; and
a step (3) of applying a lubricating oil containing the silicone oil or the fluorinated oil on the surface of the modification layer obtained in the step (2), to form the lubricating oil layer.

2. The method for producing an anti-fouling coating film according to claim 1, wherein, in the step (1), a silica conversion promoting treatment is performed after applying the fine uneven layer forming agent, to form the fine uneven layer.

3. The method for producing an anti-fouling coating film according to claim 2, wherein, in the step (2), a modification promoting treatment is performed after applying the modification layer forming agent, to form the modification layer.

4. The method for producing an anti-fouling coating film according to claim 2, wherein the silica conversion promoting treatment is performed to retain the fine uneven layer forming agent applied under an environment in which at least one of a humidification or a warming is performed.

5. The method for producing an anti-fouling coating film according to claim 3, wherein the modification promoting treatment is performed to retain the modification layer forming agent applied under an environment in which at least one of a humidification or a warming is performed.

6. The method for producing an anti-fouling coating film according to claim 1, wherein, in the step (2), a modification promoting treatment is performed after applying the modification layer forming agent, to form the modification layer.

7. The method for producing an anti-fouling coating film according to claim 6, wherein the modification promoting treatment is performed to retain the modification layer forming agent applied under an environment in which at least one of a humidification or a warming is performed.

8. An anti-fouling coating film disposed on a base substrate having at least one surface comprising at least one type of resin,
wherein the anti-fouling coating film comprises:
a fine uneven layer disposed on the base substrate having the aforementioned at least one surface, the fine uneven layer containing a silica and a polysilazane;
a modification layer disposed on a surface of the fine uneven layer, the modification layer containing a polysiloxane or a perfluoropolyether; and
a lubricating oil layer disposed on a surface of the modification layer, the lubricating oil layer containing a silicone oil or a fluorinated oil, wherein the fine uneven layer differs in a polysilazane content in a thickness direction of the fine uneven layer, and the polysilazane content on a side of the base substrate is higher than the polysilazane content on a side of the modification layer.

* * * * *